(12) United States Patent
Kim et al.

(10) Patent No.: US 11,307,290 B2
(45) Date of Patent: Apr. 19, 2022

(54) SYNCHRONOUS SIDE LOBE JAMMING METHOD FOR ELECTRONIC ATTACK

(71) Applicant: AGENCY FOR DEFENSE DEVELOPMENT, Daejeon (KR)

(72) Inventors: Soyeon Kim, Daejeon (KR); Sangwon Kim, Daejeon (KR); Dongkeun Lee, Daejeon (KR); Unseob Jeong, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 111 days.

(21) Appl. No.: 16/379,955

(22) Filed: Apr. 10, 2019

(65) Prior Publication Data

US 2020/0217927 A1    Jul. 9, 2020

(30) Foreign Application Priority Data

Jan. 4, 2019    (KR) .................. 10-2019-0001363

(51) Int. Cl.
*G01S 7/38*    (2006.01)
(52) U.S. Cl.
CPC ..................... *G01S 7/38* (2013.01)
(58) Field of Classification Search
CPC ........... G01S 7/38; G01S 7/537; G01S 7/021; G01R 23/155; H04K 3/28; H04K 3/40; H04K 3/41; H04K 3/45; H04K 3/60; H04K 3/65; H04K 3/80; H04K 3/82; H04K 3/822; H04K 3/825; H04K 3/25; H04K 3/827
USPC ......................... 342/13, 14, 16, 20
See application file for complete search history.

(56) References Cited

U.S. PATENT DOCUMENTS

| 3,019,433 | A | * | 1/1962 | White | G01S 7/38 342/15 |
| 3,604,828 | A | * | 9/1971 | Perkovich | G01S 7/4052 434/5 |
| 3,720,952 | A | * | 3/1973 | Lawsine | G01S 7/38 342/15 |
| 3,879,732 | A | * | 4/1975 | Simpson | G01S 7/38 342/14 |
| 4,096,480 | A | * | 6/1978 | Miner | F42C 13/04 102/214 |
| 4,358,766 | A | * | 11/1982 | Mehron | G01S 7/36 342/18 |

(Continued)

OTHER PUBLICATIONS

Jukka-Pekka Kauppi "An efficient set of features for pulse repetition interval modulation recognition" Conference Paper 2007, source IEEE (Year: 2007).*

*Primary Examiner* — Erin F Heard
*Assistant Examiner* — Michael W Justice
(74) *Attorney, Agent, or Firm* — Ostrolenk Faber LLP

(57) ABSTRACT

A synchronous side lobe jamming method for an electronic attack is disclosed. The method includes receiving a radar signal from an external radar; determining the number of synchronous jamming signals based on pulse repetition interval (PRI) characteristic of the received radar signal; generating a synchronous side lobe jamming signal by calculating a generation angle and a generation distance of each of the synchronous jamming signals; and transmitting the generated synchronous side lobe jamming signal to the radar at a predetermined delay time after a jammer receives a side lobe signal.

4 Claims, 5 Drawing Sheets

(56) References Cited

U.S. PATENT DOCUMENTS

| | | | | |
|---|---|---|---|---|
| 4,429,311 | A | * | 1/1984 | Barewald .................. G01S 7/38 |
| | | | | 342/15 |
| 4,990,920 | A | * | 2/1991 | Sanders, Jr. .............. G01S 7/38 |
| | | | | 342/14 |
| 5,537,120 | A | * | 7/1996 | Willmore .................. G01S 7/38 |
| | | | | 342/15 |
| 2005/0179583 | A1 | | 8/2005 | Jordan et al. |
| 2010/0302087 | A1 | * | 12/2010 | Low ........................ H04K 3/42 |
| | | | | 342/14 |
| 2014/0266851 | A1 | * | 9/2014 | Fink ..................... G01S 19/215 |
| | | | | 342/14 |
| 2016/0018512 | A1 | | 1/2016 | Wen et al. |
| 2017/0139034 | A1 | * | 5/2017 | Bromberg ................ H04K 3/45 |
| 2017/0293019 | A1 | * | 10/2017 | Caldwell .................. G01S 7/38 |

* cited by examiner

SYNCHRONOUS SIDE LOBE JAMMING METHOD FOR ELECTRONIC ATTACK

CROSS-REFERENCE TO RELATED APPLICATION

Pursuant to 35 U.S.C. § 119(a), this application claims the benefit of earlier filing date and right of priority to Korean Application No. 10-2019-0001363, filed on Jan. 4, 2019, the contents of which is incorporated by reference herein in its entirety.

BACKGROUND OF THE DISCLOSURE

1. Field of the Disclosure

The present disclosure relates to a synchronous side lobe jamming method for an electronic attack.

2. Background of the Disclosure

A radar transmits an electromagnetic wave to track a target object (hereinafter, referred to as a "target") and receives an electromagnetic wave reflected from the target. The radar then measures received time, direction, frequency and the like of the reflected electromagnetic wave to detect and track information about the target (e.g., distance, direction, velocity, etc.).

Types of radar are broadly divided into a search radar that detects roughly a direction of a target in all directions or directions of a large range and a tracking radar that continuously and accurately tracks a target of a specific direction. The search radar acquires rough information of the target and transmits it to the tracking radar, while rotating (scanning) a radar beam in all directions or widely. The tracking radar directs a radar beam to the target and tracks the target precisely. The search radar and the tracking radar are operated separately or in combination.

Meanwhile, jamming, which is an electromagnetic disturbance technique, generates radiowave interference with a larger output than a reflected wave of the radar, thereby preventing the radar from normally detecting information of the target. Such jamming includes all of electronic and mechanical interferences that interfere with, for example, detection of a target through a radar, Lidar communication, radio navigation, and the like.

Electromagnetic waves radiated from a radar are emitted as a main lobe and side lobe beam pattern. A device equipped with a jammer (jamming delivery equipment) transmits a jamming signal to a main lobe or a side lobe depending on the purpose of operation to interfere with target detection of the radar.

FIG. 1 shows a concept of a general main lobe jamming. Referring to FIG. 1, main lobe jamming is a platform in which a target 100 is the same as the jammer 101. This is performed for self-protection-jamming (SPJ). The jammer 101 receives a main lobe signal 12 and performs radio interference (arrows in FIG. 1).

Types of the main lobe jamming include synchronous jamming and noise jamming. FIG. 1 shows conventional synchronous jamming.

Main lobe jamming is to transmit a jamming pulse signal which intentionally deceives information (distance, direction, velocity, etc.) of a target by tracking a pulse repetition interval of a main lobe pulse signal transmitted from a radar in order to continuously track (orient) a jammer. In the conventional synchronous jamming, in order to deceive a tracking radar, a high power jamming signal 11 is transmitted in a tracking gate (within a time range for tracking a radar reflection position of the target) of the tracking radar to incapacitate the tracking function of the radar. The search radar continuously rotates (scans) a radar main lobe beam for the purpose of target search, rather than target tracking, so it receives more side lobe signals than main lobe signals, achieving little jamming effect even though synchronous jamming is performed on the main lobe.

The main lobe noise jamming is to send a high-power noise signal so that the search and tracking radar cannot detect information of the target itself. This is effective for both the search radar and the tracking radar but disadvantageous in that the use of high power and target's performing jamming are exposed.

Meanwhile, FIG. 2 shows a concept of general side lobe jamming. Referring to FIG. 2, a jammer 101 and a target 100 are different platforms. This is performed to protect a target (stand-off-jamming (SOJ)), not a jammer-mounted platform. After receiving a side lobe signal, the jammer 101 transmits a high power signal in consideration of a power difference between a side lobe 13 and a main lobe 12 to perform radiowave disturbance.

In the case of conventional side lobe jamming, noise jamming was more effective for the search and tracking radar than synchronous jamming. This is because the distances from the target 100 to the target 100 and the jammer 101 are different from each other (R≠R' in FIG. 2).

Specifically, due to the difference in distance between the target 100 and the jammer 101 from the radar 200, a radar arrival time difference occurs between a main lobe reflection signal 10 and a side lobe reflection signal 15. Thus, even though the jammer 101 sends out a synchronous side lobe jamming signal 14 of valid power (b), a tracking gate of the tracking radar that has received target information from the search radar still tracks the main lobe reflection signal 10 (a). Therefore, most of the conventional side lobe jamming is mainly noise jamming.

However, noise jamming requires a higher power than synchronous jamming and has a disadvantage of being easily exposed.

SUMMARY OF THE DISCLOSURE

Therefore, an aspect of the detailed description is to provide a synchronous side lobe jamming method for an electronic attack, which is capable of jamming a low power synchronous side lobe by overcoming the limitations of the existing noise side lobe jamming technique.

Another aspect of the detailed description is to provide a synchronous side lobe jamming method for an electronic attack, which may overcome a difference in arrival time to a radar between main and side lobe reflected signals without jamming exposure.

Still another aspect of the detailed description is to provide a synchronous side lobe jamming method for an electronic attack, which is capable of performing synchronous side lobe jamming when it is possible to track main and side lobe pulses of a received radar signal.

To achieve these and other advantages in accordance with the purpose of this specification, as embodied and broadly described herein, a synchronous side lobe jamming method for an electronic attack includes: receiving a radar signal from an external radar; determining the number of synchronous jamming signals based on pulse repetition interval (PRI) characteristic of the received radar signal; generating a synchronous side lobe jamming signal by calculating a generation angle and a generation distance of each of the synchronous jamming signals; and transmitting the generated synchronous side lobe jamming signal to the radar at a predetermined delay time after a jammer receives a side lobe signal.

Also, in an embodiment, the analyzing of the PRI characteristic of the received radar signal may include: selectively determining to perform any one of synchronous side lobe jamming and noise side lobe jamming based on an analysis results of the PRI characteristic of the radar signal.

Also, in an embodiment, when the PRI characteristic is a predictable pulse train according to the analysis results of the PRI characteristic of the radar signal, it may be determined to perform synchronous side lobe jamming, and PRI characteristic of the predictable pulse train may be any one of fixed, staggered, jittered, wobulated, sliding, dwell and switch (D&S), and a pattern PRI.

When the PRI characteristic is a predictable pulse train according to the analysis results of the PRI characteristic of the radar signal, it may be determined to perform noise side lobe jamming.

Also, a time for the radar to receive the synchronous slide lobe jamming signal may be calculated by adding all of a time for the jammer to receive a side lobe signal of the radar, a delay time for the jammer to transmit the synchronous side lobe jamming signal, and a value obtained by subtracting a timing at which the jammer transmits the synchronous side lobe jamming signal from a timing at which the radar receives the synchronous side lobe jamming signal.

To achieve these and other advantages in accordance with the purpose of this specification, as embodied and broadly described herein, a synchronous side lobe jamming performing apparatus for an electronic attack includes: a signal receiving unit receiving a radar signal from an external radar; a signal analyzing unit analyzing pulse repetition interval (PRI) characteristic of the received radar signal; a synchronous jamming signal generating unit determining the number of synchronous jamming signals and calculating a generation angle and a generation distance of each synchronous jamming signal when the PRI characteristic is a predictable pulse train; a jamming signal output unit outputting the generated synchronous jamming signal at a predetermined delay time after a jammer receives a side lobe signal; and a controller controlling operations of the signal receiving unit, the signal analyzing unit, the synchronous jamming signal generating unit, and the jamming signal output unit and transferring position information of the radar and the jammer obtained from the position information providing unit to the synchronous jamming signal generating unit.

As described above, according to the synchronous side lobe jamming method for an electronic attack according to the embodiment of the present invention, it is possible to perform effective side lobe jamming with less power than noise jamming. Also, it is possible to overcome a radar arrival time difference between the main lobe and the side lobe without jamming exposure. Thus, it is possible to effectively cope with not only the conventional tracking radar but also multiple long-range search radars in which more side lobe signals than main lobe signals are received by a jammer. Furthermore, it is possible to secure a core technology of a remote support electronic attack that may protect power (platform) of an ally infiltrating into an enemy air defense network.

DETAILED DESCRIPTION OF THE DISCLOSURE

Figure 1:
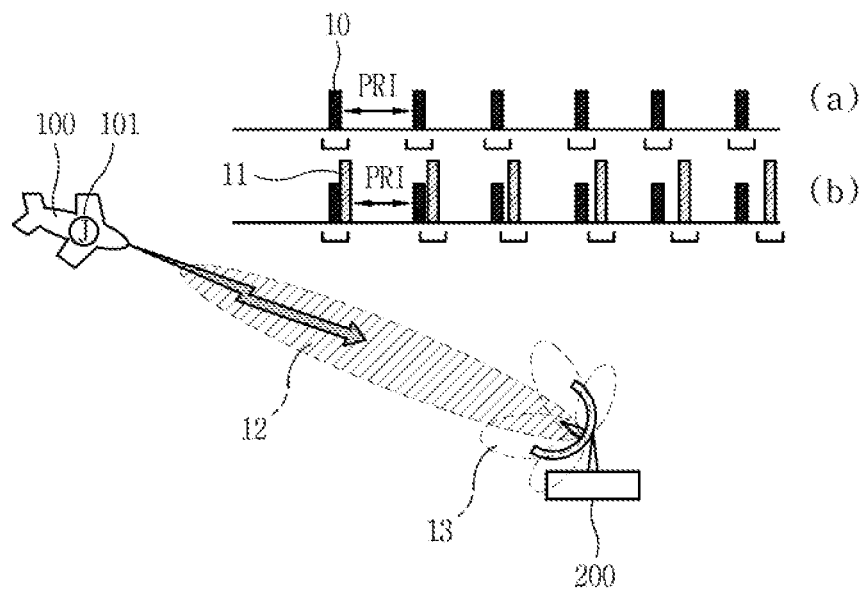
FIG. 1 is a diagram for explaining the concept of general main lobe jamming.

Description will now be given in detail of preferred embodiments of the present invention with the accompanying drawings.

In addition, since the present invention can be modified into various forms and have various embodiments, specific embodiments will be illustrated in the drawings and detailed description thereof will be given. It should be understood, however, that the invention is not intended to be limited to the specific embodiments, but includes all modifications, equivalents, and alternatives falling within the spirit and scope of the invention.

It will be understood that although the terms first, second, etc. may be used herein to describe various elements, these elements should not be limited by these terms. These terms are generally only used to distinguish one element from another. For example, without departing from the scope of the present invention, the first component may be referred to as a second component, and similarly, the second component may also be referred to as a first component. The term "and/or" includes any combination of a plurality of related listed items or any of the plurality of related listed items.

It will be understood that when an element is referred to as being "connected with" another element, the element can be connected with the another element or intervening elements may also be present. In contrast, when an element is referred to as being "directly connected with" another element, there are no intervening elements present.

Also, the terms used in the present application are used only to describe certain embodiments and are not intended to limit the present invention. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Also, unless otherwise defined, all terms used herein, including technical or scientific terms, have the same meaning as commonly understood by one of ordinary skill in the art to which this invention belongs. Terms such as those defined in commonly used dictionaries are to be interpreted as having a meaning consistent with the contextual meaning of the related art and are not to be interpreted as either ideal or overly formal unless otherwise defined in the present application.

Description will now be given in detail of the exemplary embodiments, with reference to the accompanying drawings. For the sake of brief description with reference to the drawings, the same or equivalent components will be provided with the same reference numbers, and description thereof will not be repeated.

Figure 2:
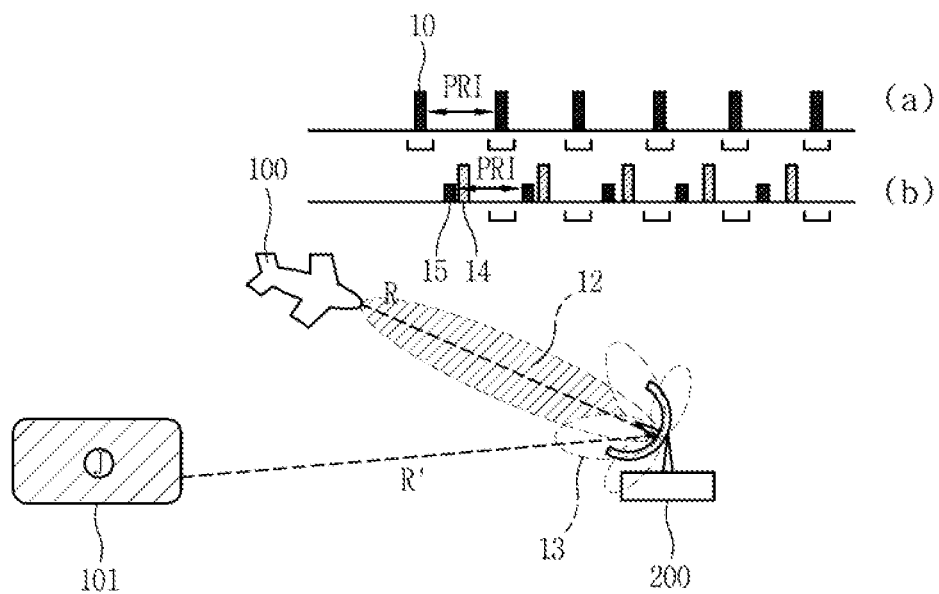
FIG. 2 is a diagram for explaining the concept of general side lobe jamming.

Referring to FIG. 2, in order to protect the target 100 from the radar 200, the jammer 101 receives a side lobe signal 15 from the radar 200 and then transmits a high output jamming signal 14 in consideration of a power difference between the side lobe 13 and the main lobe 12.

However, due to a difference between a distance from the radar 200 to the target 100 and a distance from the target 100 to the radar 200, there is a difference in arrival time between the main lobe reflection signal 10 and the side lobe reflection signal 15. This is because the tracking gate of the tracking radar which has received information from the search radar still tracks the main lobe reflection signal 10 (a) even though the jammer 101 sends out the side lobe jamming signal 14 of the effective power. As a result, the original purpose of jamming itself cannot be achieved.

Accordingly, the present invention proposes a synchronous side lobe jamming method capable of overcoming a difference in time for arrival to the radar between the main lobe and the side lobe, while overcoming 'high power' and 'exposure of performing jamming' which are limitations of the existing noise side lobe jamming.

Figure 3:
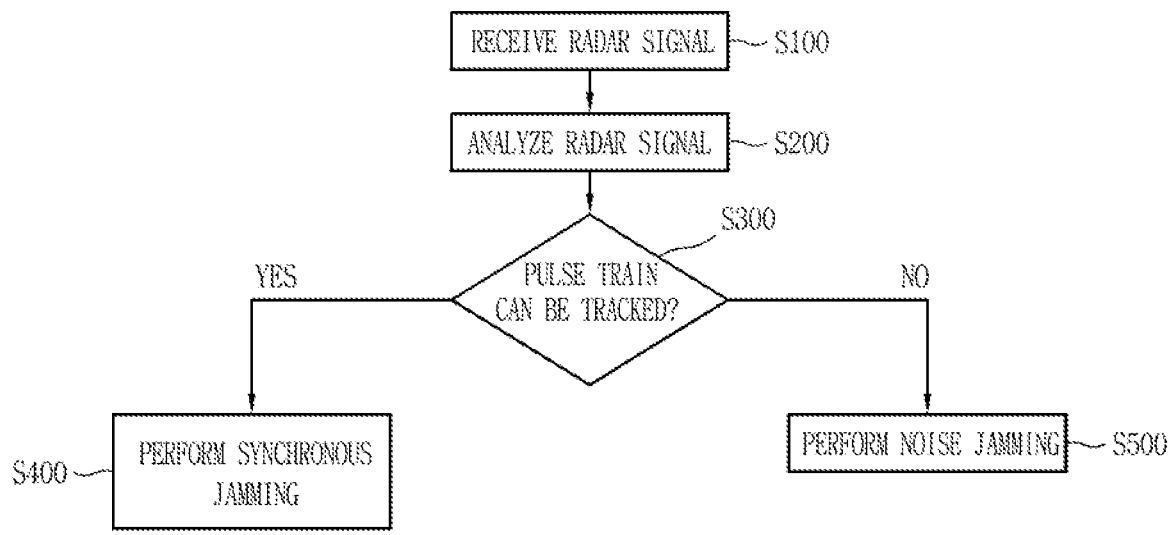
FIG. 3 is a flowchart related to a condition for executing synchronous side lobe jamming according to an embodiment of the present invention.

FIG. 3 is a flowchart related to a condition for executing synchronous side lobe jamming according to an embodiment of the present invention.

Referring to FIG. 3, the synchronous side lobe jamming method according to the present invention starts with receiving a radar signal from a radar (S100). Specifically, a jammer-mounted platform according to the present invention receives radar signals emitted from the main lobe and/or side lobe.

Here, the jammer-mounted platform is considered to be used in the same or similar concept as a synchronous side lobe jamming generating/performing device or a synchronous side lobe jamming performance (testing) device.

Next, the jammer-mounted platform performs a step S200 of analyzing the received radar signal. Specifically, the jammer-mounted platform analyzes frequency patterns, frequency repetition periods, pulse repetition interval (PRI), scan repetition INTERVAL, pulse width and intensity of received radar signals.

The jammer-mounted platform performs a step S300 of determining whether a pulse train can be tracked as a result of analyzing the radar signals.

A pulse train means that a group of pulses whose amplitude varies according to reception of the radar signals appears continuously in a space or along a line (of a time axis basis).

Accordingly, determining whether or not the pulse train may be tracked may be a step of determining whether the pulse repetition interval, i.e., PRI, analyzed in step S200 is predictable.

If the PRI is a predictable pulse train, the jammer-mounted platform performs synchronous jamming according to the present invention (S400). Such a predictable pulse train may include, for example, cases that the PRI is fixed, staggered, jittered, wobulated, sliding, dwell and switch (D&S), pattern PRI, and the like.

Meanwhile, if the PRI is determined to be unpredictable, it is determined that the arrival time difference between the main lobe reflection signal and the side lobe reflection signal cannot be overcome, and noise jamming is performed (S500). Because, at this time, the radar does not track the jamming signal but tracks the main lobe reflection signal, so that the position of the target may be exposed.

Hereinafter, a specific process of the synchronous side lobe jamming method according to the present invention will be described with reference to FIG. 4.

If the pulse train of the radar signal received from the radar is predictable so it is determined to perform synchronous jamming in FIG. 3, a step 410 of determining the number of synchronous jamming signals is performed.

It is a step of determining how many synchronous jamming signals, that is, the number of false targets (1 to N) are to be set. The number of synchronous jamming signals may be determined at a system design or operating stage based on an electric device environment, available jamming resources, the operator's setting/input, and the like.

Next, a step 420 of calculating a generation angle of the jamming signal is performed on each of the determined number of false targets (1 to N). In this corresponding step, a jamming signal is generated so that the radar misrecognizes that the target is in a 'specific orientation'. This is accomplished by generating a jamming signal after the lapse of a certain period of time after the jammer receives the radar signal from the radar.

Figure 8:
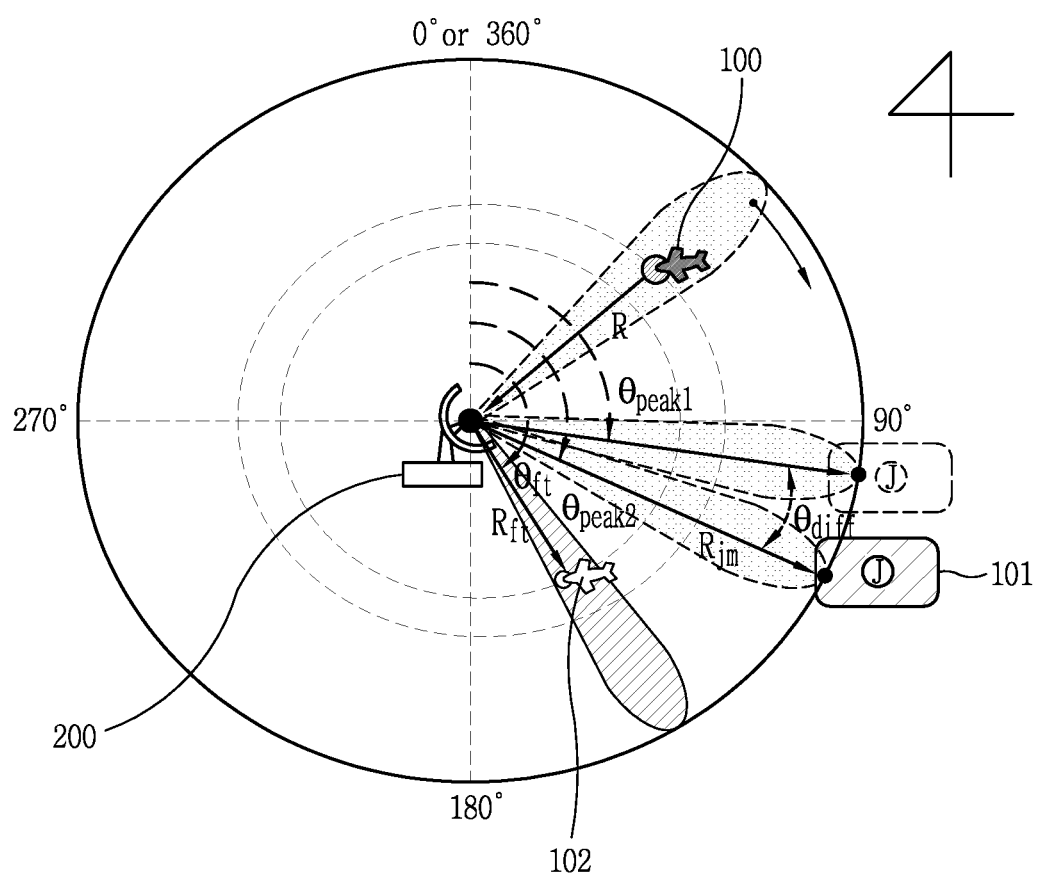
FIG. 8 is a conceptual diagram of generating a synchronous side lobe jamming signal according to an embodiment of the present invention.

Calculation of an angle of the jamming signal will be described in more detail with reference to FIG. 8. FIG. 8 shows an example in which one false target 102 is generated at an angle ($\theta_{ft}$).

As shown in FIG. 8, the angle of the jamming signal is an angle at which the radar 200 looks at the jammer-mounted platform 101. It is assumed that the angle is 0 degree in a true north direction and increases in a clockwise direction.

In order to calculate the angle of the jamming signal, a scan period of the radar 200 (time taken for the main lobe signal of the radar rotates to be returned to the original position) must be checked. The scan period ($T_{scan}$) of the radar 200 may be calculated through Equation 1 below.

$$T_{scan} = \frac{T_{peak2} - T_{peak1}}{360 + \theta_{diff}} \times 360 \qquad \text{[Equation 1]}$$

Here, $T_{peak1}$ is a time when the jammer 101 first received the main lobe signal emitted from the radar 200, and $T_{peak2}$ is a time when the jammer 101 received the main lobe signal after the first received main lobe signal. $\theta_{diff}$ denotes an angle difference between the main lobe signal at times of $T_{peak1}$ and $T_{peak2}$.

Meanwhile, $\theta_{diff}$ may be calculated by Equation 2 below.

$$\theta_{diff} = \begin{cases} \theta_{peak2} - \theta_{peak1}, & \text{if } ((\text{mod}360(\theta_{peak2} - \theta_{peak1}) < 180) \text{ and } (D_{scan} = CW)) \\ & \text{or } ((\text{mod}360(\theta_{peak2} - \theta_{peak1}) \geq 180) \text{ and } (D_{scan} = CCW)) \\ \theta_{peak1} - \theta_{peak2}, & \text{else} \end{cases} \quad \text{[Equation 2]}$$

Here, $\theta_{peak1}$ and $\theta_{peak2}$ denote the angles of the main lobe signal at $T_{peak1}$ and $T_{peak2}$, respectively. Also, mod 360(•) is modular arithmetic for 360 degrees. Modular arithmetic is a computation method that defines the sum and the product of integers for the remainder of a given number.

Also, pcan is a scanning rotation direction of the radar. CW (clockwise) means that a beam of the radar rotates in a clockwise direction, and CCW (counter clockwise) means that a beam of the radar rotates in a counterclockwise direction.

Figure 4:
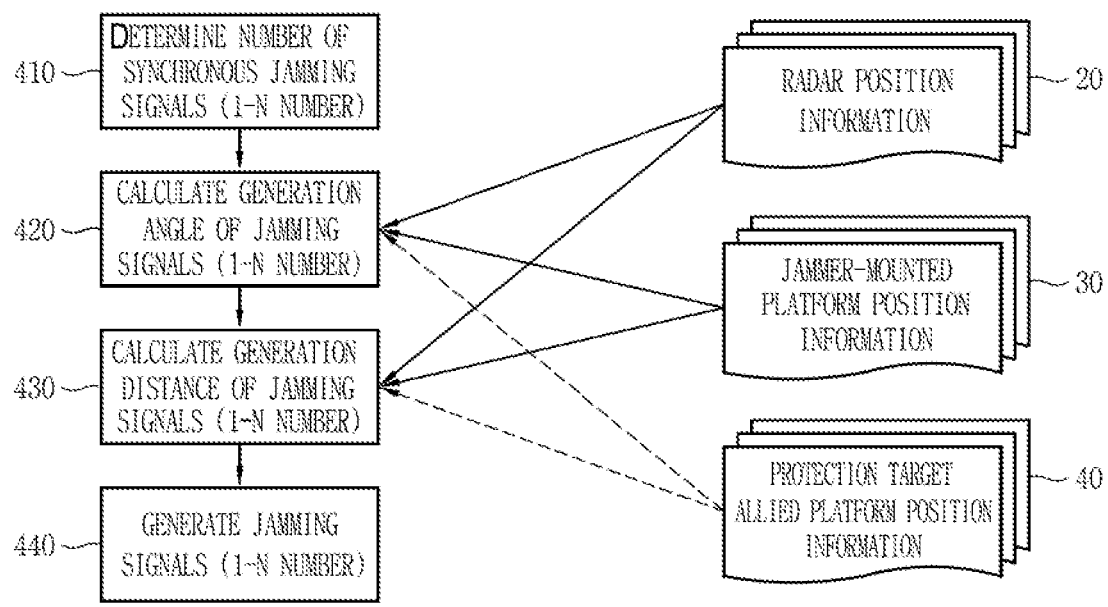
FIG. 4 is a flowchart illustrating a specific procedure of a synchronous side lobe jamming method according to the present invention.

Meanwhile, referring to FIG. 4, radar position information 20, jammer-mounted platform position information 30, and positional information 40 of a protection target allied platform, i.e., target, are required for calculating a generation angle of the jamming signal.

Since most radars operate at a fixed position, the radar position information 20 is considered to be known. In addition, since the position of the jammer-mounted platform may be secured from a navigation device of the jammer, a direction θ in which the main lobe signal indicates the jammer-mounted platform on the basis of the radar may be calculated through Equation 3 below when the globe is assumed to be a perfect sphere.

$\theta(\Phi_r, \lambda_r, \Phi_{ac}) = a\tan 2(\sin(\Delta_{ac} - \lambda_r) \cdot \cos(\Phi_{ac}) \cdot \cos(\Phi_r)$
$\cdot \sin(\psi_{ac}) - \sin(\Phi_r) \cdot \cos(\Phi_{ac}) \cdot \cos(\lambda_{ac} - \lambda_r))$ [Equation 3]

Here, $\phi_r$ is a latitude of the radar and $\lambda_r$ is a longitude of the radar. Also, $\phi_{ac}$ is a latitude of the jammer-mounted platform and $\lambda_{ac}$ is a longitude of the jammer-mounted platform.

The value of $\theta_{peak1, 2}$ may be calculated by using the position information 20 (FIG. 4) of the radar and the position information 30 (FIG. 4) of the jammer-mounted platform 30, that is, the latitude and the longitude values corresponding to the position information 20 and 30, at a timing $T_{peak1, 2}$.

Next, the following Equation 4 may be applied to generate a false target accurately at the angle indicated by the main lobe direction of the radar 200.

Specifically, when the angle indicated by the main lobe direction of the radar 200 is assumed as $\theta_{ft}$, a direction of the false target to be generated may be calculated by applying the above-described resultant values of Equations 1 to 3 to the following Equation 4 below.

$$\theta_{ft}(t) = \text{mod}360\left(\frac{t - T_{peak2}}{T_{scan}} \times 360 + \theta_{peak2}\right) \quad \text{[Equation 4]}$$

Jamming is performed (output) at a timing t at which the false target is accurately generated at the desired angle $\theta_{ft}$, i.e., the angle indicated by the main lobe direction of the radar 200, using Equation 4 above. Then, the false target accurately appears in a direction $\theta_{ft}$ indicated by the main lobe signal with respect to the radar.

Meanwhile, in one embodiment, when a protection target allied platform exists and a false target is to be generated at an angle related thereto, the protection target allied platform position information 40 is used as shown in FIG. 4. Specifically, the angle at which the allied platform exists is calculated and used to calculate the angle ($\theta_{ft}$) of the false target.

Therefore, whether or not the protection target allied platform position information 40 is used may be determined by a user at the time of operation according to an operation mode/method of the jammer.

Referring to FIG. 4 again, after the step (420) of calculating the generation angle of the jamming signal, a step (430) of calculating a generation distance of the jamming signal is performed. In this step, the radar misrecognizes that the false target is present at a 'specific distance'. This also is accomplished as a jamming signal is generated after the lapse of a predetermined period of time after the jammer receives a radar signal of the radar.

A specific calculation of the generation distance of the jamming signal may be calculated through Equations 5 to 9 below with reference to FIGS. 7 and 8.

Figure 7:
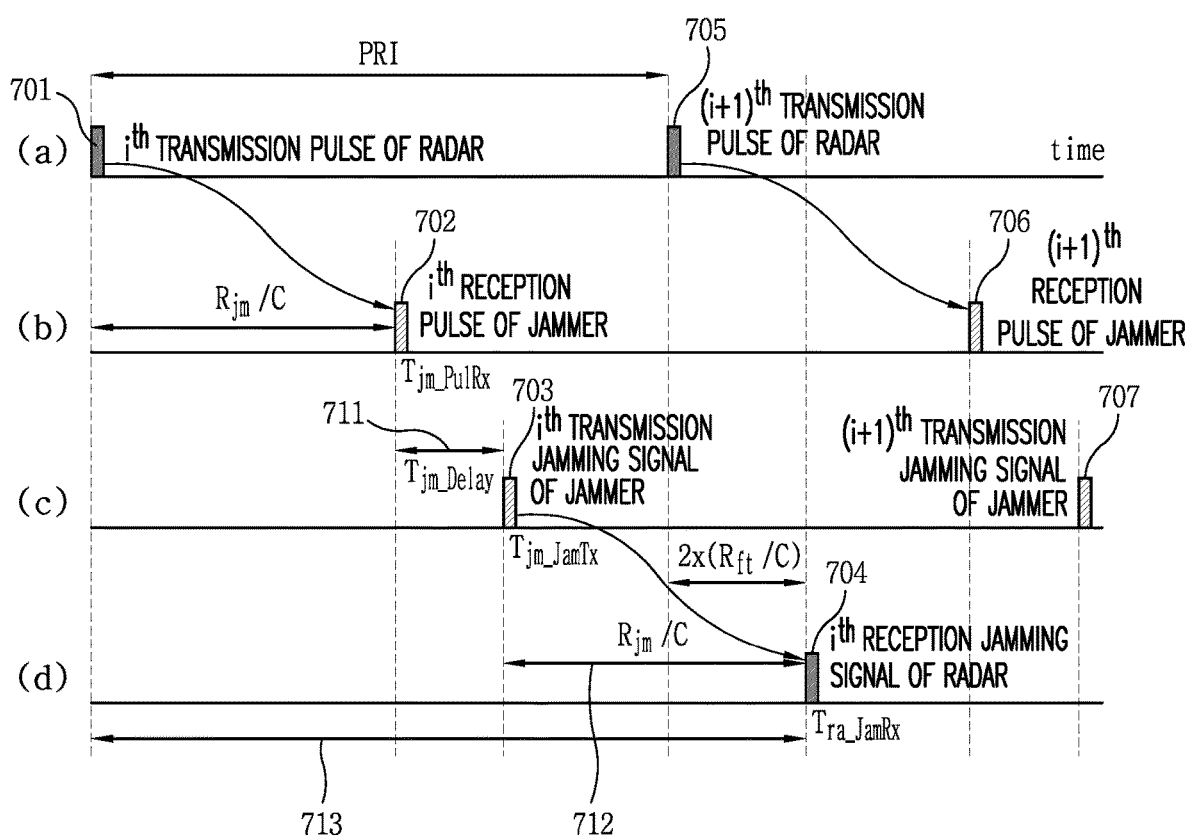
FIG. 7 is a diagram for explaining a timing of generating a synchronous side lobe jamming signal according to an embodiment of the present invention.

FIG. 7 shows a graph (a) of a timing at which the radar transmits a side lobe signal, a graph (b) of a timing at which the jammer receives the side lobe signal, a graph (c) of a timing at which the jammer transmits a side lobe jamming signal, and a graph (d) of a timing at which the radar receives the side lobe jamming signal.

In (a) of FIG. 7, an interval between the timings 701 and 705 at which the radar transmits the radar side lobe signal is the pulse repetition interval, i.e., PRI, of the radar signal. (b) of FIG. 7 includes timings 702 and 706 at which the jammer receives the side lobe signal of the radar. (c) of FIG. 7 includes timings 703 and 707 at which the jammer transmits the jamming signal after the lapse of a predetermined delay time 711 after the side lobe signal is received. Also, (d) of FIG. 7 indicates a timing 704 at which the side lobe jamming signal is received at the radar.

$T_{ra\_JamRx} = T_{im\_PulRx} + T_{im\_Delay} + (T_{ra\_JamRx} - T_{im\_JamTx})$ [Equation 5]

Referring to FIG. 7, $T_{ra\_JamRx}$ is a timing 704 at which the radar receives an $i^{th}$ side lobe jamming signal. It is calculated by adding all of the timing 702 $T_{im\_PulRx}$ at which the jammer receives the side lobe signal, a timing 711 delayed until the jammer transmits the side lobe jamming signal after receiving the side lobe signal, and a time ($T_{ra\_JamRx} - T_{im\_JamTx}$) which is a time difference 712 obtained by subtracting the timing 703 at which the jammer transmits the side lobe jamming signal from the timing 704 at which the radar receives the $i^{th}$ side lobe jamming signal.

Here, $T_{im\_PulRx}$ (702), $T_{im\_Delay}$ (711), and $T_{im\_JamTx}$ (703) denote a time for the jammer to receive an $i^{th}$ transmission pulse of the radar in (b) of FIG. 8, a delay time taken for the jammer to transmit the jamming signal after the $i^{th}$ pulse is received, and a time taken for the jammer to transmit the $i^{th}$ side lobe jamming signal, respectively. Also, C denotes a velocity of radiowaves.

$T_{im\_PulRx}$ (702) and ($T_{ra\_JamRx}$ (704)–$T_{im\_JamTx}$ (703)) (712) are pulse transmission and reception time between the radar and the jammer. It is the same as a value $\frac{R_{jm}}{C}$ obtained by dividing a distance $R_{im}$ between the radar and the jammer by the radiowave movement velocity C in (b) of FIG. 8. The distance between the radar and the jammer may be calculated by using the position information 20 of the tracking radar and the position information 30 of the jammer-mounted platform in FIG. 4.

Applying this, Equation 5 may be expressed as Equation 6 below.

$$T_{ra\_JamRx} = \frac{R_{jm}}{C} + T_{jm\_Delay} + \frac{R_{jm}}{C}$$
$$= 2 \times \frac{R_{jm}}{C} + T_{jm\_Delay}$$

[Equation 6]

Here, the timing $T_{ra\_JamRx}$ (704) at which the radar receives the $i^{th}$ side lobe jamming signal may be calculated by Equation 7 below.

$$T_{ra\_JamRx} = i \times PRI + 2 \times \frac{R_{ft}}{C}$$

[Equation 7]

Here, $R_{ft}$ is a distance between the radar 200 (FIG. 8) and the false target 102 (FIG. 8). When the distance between the radar and the false target is $R_{ft}$, a time at which the radar transmits the pulse signal and receives a reflected signal to the false target may be calculated through $$2 \times \frac{R_{ft}}{C}.$$

Also, i*PRI means i times the pulse repetition interval of the radar. The reason for addition is because the false target jamming effect for side lobe jamming is actually applied from the $(i+1)^{th}$ transmission pulse 705. When Equation 7 is substituted to Equation 6 above, Equation 8 may be obtained as follows.

$$2 \times \frac{R_{jm}}{C} + T_{jm\_Delay} = i \times PRI + 2 \times \frac{R_{ft}}{C}$$

[Equation 8]

Further, this may be rearranged as shown in the following Equation 9.

$$T_{jm\_Delay} = i \times PRI + 2 \times \left(\frac{R_{ft} - R_{jm}}{C}\right)$$

[Equation 9]

Here, $T_{jm\_Delay}$ (711) denotes a delay time required for the jammer to transmit the jamming signal after receiving the $i^{th}$ pulse. That is, if the jammer determines the arbitrary distance ($R_{ft}$) to the false target and then generates a false target at the corresponding distance, the jammer may transmit (703) after a predetermined delay time (703) after the $i^{th}$ side lobe signal based on Equation 9 is receives (702).

The distance $R_{im}$ between the radar and the jammer in FIG. 8 may be calculated through the position information 20 of the radar and the position information 30 of the jammer-mounted platform. In an example, if the protection target allied platform exists and a false target is to be generated near the corresponding distance, the distance from the radar to the allied platform may be calculated using the position information 40 of the protection target allied platform and used to calculate the distance ($R_{ft}$) of the false target.

Whether to use the protection target allied platform position information 40 may be determined by the user at the time of operation according to the jammer operation mode/method as described above.

When both the generation angle and generation distance of the jamming signal are calculated, the jamming signal is generated at a predetermined delay time 440 as described above. At this time, the jamming signal is transmitted by the number determined in step 410.

Figure 5:
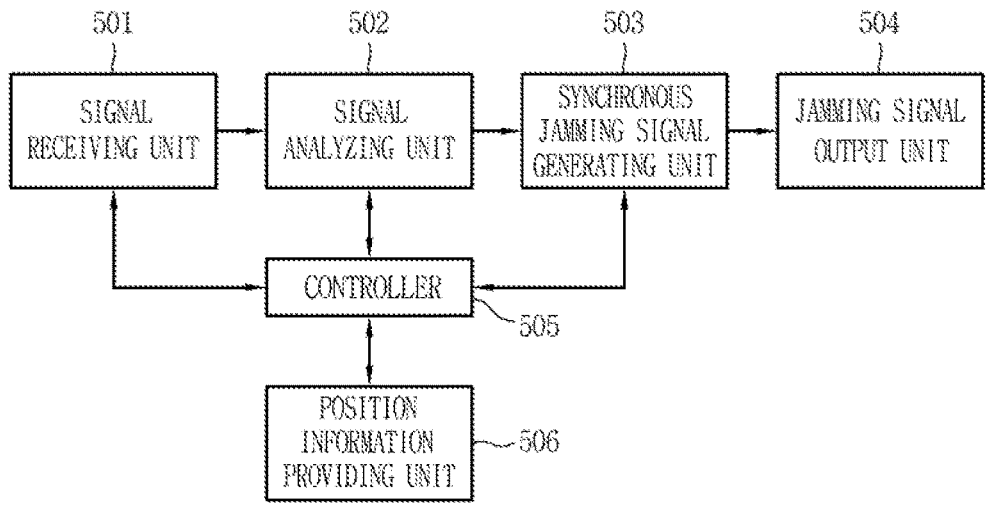
FIG. 5 is a block diagram illustrating an exemplary configuration of an apparatus for performing a synchronous side lobe jamming method according to an embodiment of the present invention.

FIG. 5 is a block diagram illustrating an exemplary configuration of a synchronous side lobe jamming performing apparatus/synchronous side lobe jamming generating apparatus/synchronous side lobe jamming performance (testing) apparatus according to an embodiment of the present invention. Hereinafter, for convenience of explanation, it will be referred to as an "apparatus".

The apparatus may include a signal receiving unit 501, a signal analyzing unit 502, a synchronous jamming signal generating unit 503, a jamming signal output unit 504, and a controller 505. In addition, a position information providing unit 506 may be additionally provided inside or outside the apparatus so as to acquire/recognize radar position information, jammer-mounted platform position information, and, if necessary, protection target allied platform position information.

The signal receiving unit 501 receives a high-frequency pulse signal from an external radar. The signal receiving unit 501 may further include a filter (not shown) for filtering noise from a pulse signal received from the radar.

The signal analyzing unit 502 determines whether the PRI of the radar signal of the received radar is predictable. The predictable PRI may include, for example, fixed, staggered, jittered, wobulated, sliding, dwell and switch (D&S), pattern PRI, and the like.

In addition, as a radar signal of a recently complicated radar is complicated, a single signal source is frequently mistaken by multiple radars. Accordingly, the signal analyzing unit 502 according to the present invention may be configured to distinguish the PRI modulation characteristics of the radar signal by various methods.

For example, in addition to a statistical method using the existing histogram, a method using a neural network, and a method of comparing similarity with a model constant, the signal analyzing unit 502 may recognize whether it is a predictable PRI through various steps such as aligning pulse arrival time information from pulse information of a received radar signal in time order, generating a PRI sequence therefrom, and performing compensation an omitted pulse signal, and the like.

The signal analyzing unit 502 transmits to the controller 505 whether the PRI of the radar signal of the radar is predictable. If the PRI of the radar signal is predictable, the controller 505 transmits a control signal to the synchronization jamming signal generating unit 503 so as to generate a synchronous jamming signal. If the PRI of the radar signal is unpredictable, the controller 505 generates a control signal to output a noise jamming signal. At this time, a high-power noise jamming signal is output and generation of a synchronization jamming signal is limited.

The synchronous jamming signal generating unit 503 predicts/tracks the PRI of the radar signal to calculate the number of generated synchronous jamming signals, a generation angle of the synchronous jamming signals, and a generation distance of the synchronous jamming signals.

The number of generated jamming signals may be determined in consideration of the PRI of the radar signal emitted from the radar, a scan speed of the radar, and a movement speed of the target. The detailed calculation method of the generation angle and generation distance of the jamming signal has been described in detail above, so a description thereof will be omitted here.

Thus, in the present invention, angle deception and distance deception are simultaneously performed. Meanwhile, in another example, a velocity gate pull off (VGPO) may be added as complex jamming.

The jamming signal output unit 504 transmits the jamming signal at a predetermined delay time interval in consideration of the calculated generation angle and the generation distance for each of the number of generated jamming signals determined by the synchronous jamming signal generating unit 503.

The jamming signal output unit 504 may further include a transmitter (not shown) for transmitting the generated synchronous side lobe jamming signal to the radar. In addition, the jamming signal output unit 504 may appropriately adjust the ratio of output strength of the jamming signal based on a magnitude of the radar signal of the radar, and amplify the jamming signal through an amplifier (not shown), and transmits the corresponding signal to the radar.

Meanwhile, the controller 505 controls the overall operation of each component of the apparatus.

For example, if the analysis result of the signal analyzing unit 502 indicates that the radar signal is predictable PRI, the controller 505 may transmit a control signal corresponding to the synchronous jamming signal generating unit 503 to generate a synchronous side lobe jamming signal. Also, the controller 505 may transmit the position information 20 of the radar, the position information 30 of the jammer-mounted platform, and the position information 40 of the protection target allied platform (if necessary) obtained from the position information providing unit 506 to the synchronous jamming signal generating unit 503.

Figure 6:
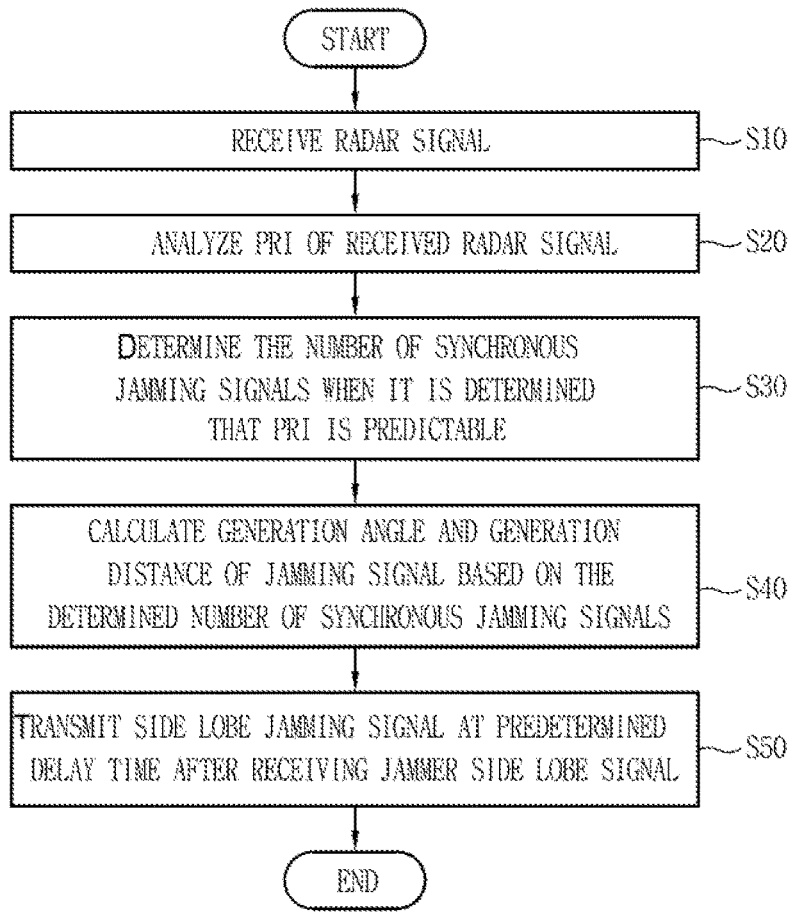
FIG. 6 is a representative flowchart illustrating a series of processes of transmitting synchronous side lobe jamming to a radar according to an embodiment of the present invention.

Next, FIG. 6 shows a series of processes for transmitting synchronous side lobe jamming to a radar according to an embodiment of the present invention.

Referring to FIG. 6, first, a radar signal is received from a radar (S10). Next, a PRI, i.e., a pulse repetition interval, of the received radar signal, is analyzed (S20).

If it is determined that the PRI of the radar signal is predictable, the number of generated synchronous side lobe jamming signals is determined (S30). Then, a generation angle and a generation distance of the jamming signal are calculated based on position information of the radar and position information of the jammer-mounted platform for each of the determined synchronous side lobe jamming signals (S40).

After the generation angle and the generation distance of the jamming signal are calculated as described above, a jammer side lobe signal is received, and thereafter, a side lobe jamming signal is transmitted at a predetermined time delay (S50).

As described above, according to the synchronous side lobe jamming method for an electronic attack according to the embodiment of the present invention, it is possible to perform effective side lobe jamming with less power than noise jamming. Also, it is possible to overcome a radar arrival time difference between the main lobe and the side lobe without jamming exposure.

Thus, it is possible to effectively cope with not only the conventional tracking radar but also multiple long-range search radars in which more side lobe signals than main lobe signals are received by a jammer. Furthermore, it is possible to secure a core technology of a remote support electronic attack that may protect power (platform) of an ally infiltrating into an enemy air defense network.

The foregoing description has been given of the preferred embodiments of the present invention. However, it is clearly understood that the preferred embodiments are by way of illustration and example only, and thus the present invention can be modified, changed or improved into various forms without departing from the scope and claims of the present invention. Further, the method according to the present invention described herein can be implemented in software, hardware, or a combination thereof. For example, the method according to the present invention may be stored in a storage medium (e.g., an internal memory of a terminal, a flash memory, a hard disk, etc.) and implemented with codes or instructions included in a software program executable by a processor (e.g., a microprocessor in a terminal).

What is claimed is:

1. A synchronous side lobe jamming method by a jammer for an electronic attack, the synchronous side lobe jamming method comprising:
   receiving a radar signal including a synchronous side lobe signal from an external radar;
   determining the number of synchronous side lobe jamming signals based on pulse repetition interval (PRI) of the received synchronous side lobe signal;
   generating the synchronous side lobe jamming signals by calculating a generation angle and a generation distance of the synchronous side lobe jamming signals; and
   transmitting the generated synchronous side lobe jamming signals to the radar after the jammer receives the side lobe signal so that one or more virtual false targets are generated at particular positions and angles based on adding a time delay to the generated synchronous side lobe jamming signals,
   analyzing a PRI characteristic of the received radar signal, including selectively determining to perform one of synchronous side lobe jamming and noise side lobe jamming based on an analysis results of the PRI characteristic of the radar signal,
   wherein, when the PRI characteristic is a predictable pulse train according to the analysis results of the PRI characteristic of the radar signal, it is determined to perform synchronous side lobe jamming, and the PRI characteristic of the predictable pulse train includes a pattern PRI pulse train having at least one of a pulse train having a fixed/constant PRI and a pulse train having a PRI that is not fixed/constant, and
   wherein, when the PRI characteristic is an unpredictable pulse train according to the analysis results of the PRI characteristic of the radar signal, it is determined to perform noise side lobe jamming,
   wherein a scan period ($T_{scan}$) of the radar is calculated through Equation 1 below to calculate the generation angle of the synchronous side lobe jamming signals, $$T_{scan} = \frac{T_{peak2} - T_{peak1}}{360 + \theta_{diff}} \times 360 \qquad \text{(Equation 1)}$$

Here, $T_{peak1}$ is a time when the jammer first received a main lobe signal emitted from the radar, and $T_{peak2}$ is a time when the jammer received the main lobe signal after the first received main lobe signal, $\theta_{diff}$ denotes an angle difference between the main lobe signal at times of $T_{peak1}$ and $T_{peak2}$, wherein, $\theta_{diff}$ is calculated by Equation 2 below, $$\theta_{diff} = \begin{cases} \theta_{peak2} - \theta_{peak1}, & \text{if } ((\text{mod}360(\theta_{peak2} - \theta_{peak1}) < 180) \text{ and } (D_{scan} = CW)) \\ & \text{or } ((\text{mod}360(\theta_{peak2} - \theta_{peak1}) \geq 180) \text{ and } (D_{scan} = CCW)) \\ \theta_{peak1} - \theta_{peak2}, & \text{else} \end{cases} \quad \text{(Equation 2)}$$

here, $\theta_{peak1}$ and $\theta_{peak2}$ denote angles of the main lobe signal at $T_{peak1}$ and $T_{peak2}$, respectively, and mod 360(•) is modular arithmetic for 360 degrees, modular arithmetic is a computation method that defines the sum and the product of integers for the remainder of a given number, $D_{scan}$ is a scanning rotation direction of the radar, CW is a beam of the radar rotates in a clockwise direction, and CCW is a beam of the radar rotates in a counterclockwise direction, wherein a direction θ in which the main lobe signal indicates a jammer-mounted platform on the basis of the radar is calculated through Equation 3 below when the globe is assumed to be a perfect sphere, $$\theta(\Phi_r, \lambda_r, \Phi_{ac}, \lambda_{ac}) = a\tan 2(\sin(\lambda_{ac} - \lambda_r) \cdot \cos(\Phi_{ac}) \cdot \cos(\Phi_r) \cdot \sin(\Phi_{ac}) - \sin(\Phi_r) \cdot \cos(\Phi_{ac}) \cdot \cos(\lambda_{ac} - \lambda_r)) \quad \text{(Equation 3)}$$

here, $\phi_r$ is a latitude of the radar, $\lambda_r$ is a longitude of the radar, $\phi_{ac}$ is a latitude of the jammer-mounted platform, and $\lambda_{ac}$ is a longitude of the jammer-mounted platform, and wherein, a direction $\theta_{ft}$ of each of the false targets to be generated is calculated by applying resultant values of the Equations 1 to 3 to the following Equation 4 below.

$$\theta_{ft}(t) = \text{mod}360\left(\frac{t - T_{peak2}}{T_{scan}} \times 360 + \theta_{peak2}\right). \quad \text{(Equation 4)}$$

2. The synchronous side lobe jamming method of claim 1, wherein the PRI characteristic of the predictable pulse train further includes one of staggered, jittered, wobulated, sliding, and dwell and switch (D&S).

3. The synchronous side lobe jamming method of claim 1, wherein a time for the radar to receive the synchronous slide lobe jamming signal is calculated by adding all of a time for the jammer to receive a side lobe signal of the radar, a delay time for the jammer to transmit the synchronous side lobe jamming signal, and a value obtained by subtracting a timing at which the jammer transmits the synchronous side lobe jamming signal from a timing at which the radar receives the synchronous side lobe jamming signal.

4. A synchronous side lobe jamming performing apparatus for an electronic attack, the synchronous side lobe jamming performing apparatus comprising:

a signal receiver receiving a radar signal including a synchronous side lobe signal from an external radar;

a signal analyzer analyzing pulse repetition interval (PRI) characteristic of the received radar signal;

a synchronous jamming signal generator determining the number of synchronous side lobe jamming signals and calculating a generation angle and a generation distance of each of the synchronous side lobe jamming signals to generate at least one synchronous side lobe jamming signals when the PRI characteristic is a predictable pulse train;

a jamming signal transmitter outputting the synchronous jamming signal generated by the synchronous jamming signal generator to the radar after a jammer receives the side lobe signal so that one or more virtual false targets are generated at particular positions and angles based on adding a time delay to the generated synchronous side lobe jamming signal; and a controller controlling operations of the signal receiver, the signal analyzer, the synchronous jamming signal generator, and the jamming signal transmitter, wherein the controller determines to perform synchronous side lobe jamming when the PRI characteristic is a predictable pulse train according to the analysis results of the PRI characteristic of the radar signal, and the PRI characteristic of the predictable pulse train includes a pattern PRI pulse train having at least one of a pulse train having a fixed/constant PRI and a pulse train having a PRI that is not fixed/constant, and wherein the controller determines to perform noise side lobe jamming when the PRI characteristic is an unpredictable pulse train according to the analysis results of the PRI characteristic of the radar signal, wherein a scan period ($T_{scan}$) of the radar is calculated through Equation 1 below to calculate the generation angle of the synchronous side lobe jamming signals, $$T_{scan} = \frac{T_{peak2} - T_{peak1}}{360 + \theta_{diff}} \times 360 \quad \text{(Equation 1)}$$

here, $T_{peak1}$ is a time when the jammer first received a main lobe signal emitted from the radar, and $T_{peak2}$ is a time when the jammer received the main lobe signal after the first received main lobe signal, $\theta_{diff}$ denotes an angle difference between the main lobe signal at times of $T_{peak1}$ and $T_{peak2}$, wherein, $\theta_{diff}$ is calculated by Equation 2 below, $$\theta_{diff} = \begin{cases} \theta_{peak2} - \theta_{peak1}, & \text{if } ((\text{mod}360(\theta_{peak2} - \theta_{peak1}) < 180) \text{ and } (D_{scan} = CW)) \\ & \text{or } ((\text{mod}360(\theta_{peak2} - \theta_{peak1}) \geq 180) \text{ and } (D_{scan} = CCW)) \\ \theta_{peak1} - \theta_{peak2}, & \text{else} \end{cases} \quad \text{(Equation 2)}$$

here, $\theta_{peak1}$ and $\theta_{peak2}$ denote angles of the main lobe signal at $T_{peak1}$ and $T_{peak2}$, respectively, and mod 360(•) is modular arithmetic for 360 degrees, modular arithmetic is a computation method that defines the sum and the product of integers for the remainder of a given number, $D_{scan}$ is a scanning rotation direction of the radar, CW is a beam of the radar rotates in a clockwise direction, and CCW is a beam of the radar rotates in a counterclockwise direction, wherein a direction θ in which the main lobe signal indicates a jammer-mounted platform on the basis of the radar is calculated through Equation 3 below when the globe is assumed to be a perfect sphere, $$\theta(\Phi_r, \lambda_r, \Phi_{ac}, \lambda_{ac}) = a\tan 2(\sin(\lambda_{ac}-\lambda_r)\cdot\cos(\Phi_{ac})\cdot\cos(\Phi_r)\cdot\sin(\Phi_{ac})-\sin(\Phi_r)\cdot\cos(\Phi_{ac})\cdot\cos(\lambda_{ac}-\lambda_r))$$ (Equation 3)

here, $\phi_r$ is a latitude of the radar, $\lambda_r$ is a longitude of the radar, $\phi_{ac}$ is a latitude of the jammer-mounted platform, and $\lambda_{ac}$ is a longitude of the jammer-mounted platform, and wherein, a direction $\theta_{ft}$ of each the false targets to be generated is calculated by applying resultant values of the Equations 1 to 3 to the following Equation 4 below.

$$\theta_{ft}(t) = \mod 360\left(\frac{t-T_{peak2}}{T_{scan}} \times 360 + \theta_{peak2}\right).$$ (Equation 4)

\* \* \* \* \*